(12) United States Patent
Robison et al.

(10) Patent No.: US 12,416,365 B2
(45) Date of Patent: Sep. 16, 2025

(54) NONMETAL VALVE SEAT HOUSING

(71) Applicant: CALDERA ENGINEERING, L.C., Provo, UT (US)

(72) Inventors: Jeffrey C. Robison, Provo, UT (US); Michael Luque, Provo, UT (US); Lance Mock, Provo, UT (US); Ryan Weber, Provo, UT (US)

(73) Assignee: CALDERA ENGINEERING, L.C., Provo, UT (US)

(*) Notice: Subject to any disclaimer, the term of this patent is extended or adjusted under 35 U.S.C. 154(b) by 6 days.

(21) Appl. No.: 18/379,611

(22) Filed: Oct. 12, 2023

(65) Prior Publication Data

US 2024/0125394 A1 Apr. 18, 2024

Related U.S. Application Data

(60) Provisional application No. 63/415,791, filed on Oct. 13, 2022.

(51) Int. Cl.
*F16K 5/08* (2006.01)
*F16K 25/00* (2006.01)

(52) U.S. Cl.
CPC .............. *F16K 5/08* (2013.01); *F16K 25/005* (2013.01)

(58) Field of Classification Search
CPC .............. F16K 5/08; F16K 25/005; F16K 1/42
See application file for complete search history.

(56) References Cited

U.S. PATENT DOCUMENTS

| 4,823,842 | A | 4/1989 | Toliusis |
| 8,051,874 | B2 * | 11/2011 | McCarty ............... F16K 25/005 251/360 |
| 11,022,228 | B2 * | 6/2021 | Weber ...................... F16K 1/42 |
| 2012/0049099 | A1 | 3/2012 | McCarty |
| 2017/0254422 | A1 | 9/2017 | Thompson et al. |
| 2020/0018412 | A1 | 1/2020 | Weber et al. |
| 2020/0102090 | A1 | 4/2020 | Morden et al. |

OTHER PUBLICATIONS

International Searching Authority, International Search Report and Written Opinion dated Mar. 15, 2024 in International Serial No. PCT/US2023/035057.

* cited by examiner

*Primary Examiner* — Michael R Reid
(74) *Attorney, Agent, or Firm* — SNELL & WILMER L.L.P.

(57) ABSTRACT

A valve seat assembly is provided herein. The valve seat may include a ceramic valve seat liner positioned within an upper segment that is proximal to a lower segment. An upper retaining ring may at least partially surround the upper segment.

14 Claims, 10 Drawing Sheets

NONMETAL VALVE SEAT HOUSING

CROSS-REFERENCE TO RELATED APPLICATION

This application claims the benefit of and priority to U.S. Provisional Application Ser. No. 63/415,791, filed Oct. 13, 2022, the contents of which are hereby incorporated by reference in their entirety.

BACKGROUND

In various industrial processes, such as in mineral processing, solids and liquids may be conveyed from one vessel to another under high temperatures and high pressures. Flow control may be desired between two vessels so that the flow may regulated.

SUMMARY

In various embodiments, a valve seat assembly is provided comprising a ceramic seat liner coaxially disposed with a ceramic seat end liner, an upper segment surrounding a first outer diameter surface portion of the ceramic seat liner, the upper segment disposed with the ceramic seat liner, and a lower segment surrounding a second outer diameter surface portion of the ceramic seat liner, the first outer diameter surface portion being proximal to the second outer diameter surface portion.

In various embodiments, a method of manufacturing a valve seat assembly is provided comprising disposing a ceramic seat liner to be coaxial with a ceramic seat end liner, coupling an upper segment surrounding a first outer diameter surface portion of the ceramic seat liner, the upper segment disposed with the ceramic seat liner, and coupling a lower segment surrounding a second outer diameter surface portion of the ceramic seat liner, the first outer diameter surface portion being proximal to the second outer diameter surface portion.

In various embodiments, a valve seat assembly is provided comprising a seat liner assembly comprising a seat liner coaxially disposed within a seat liner housing, an upper retaining ring disposed distal to an upper segment, a lower segment disposed distal to the upper retaining ring, the lower segment comprising a radial cut out and the seat liner housing comprising a radial inset, the radial inset and the radial cut out forming a circumferential channel.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
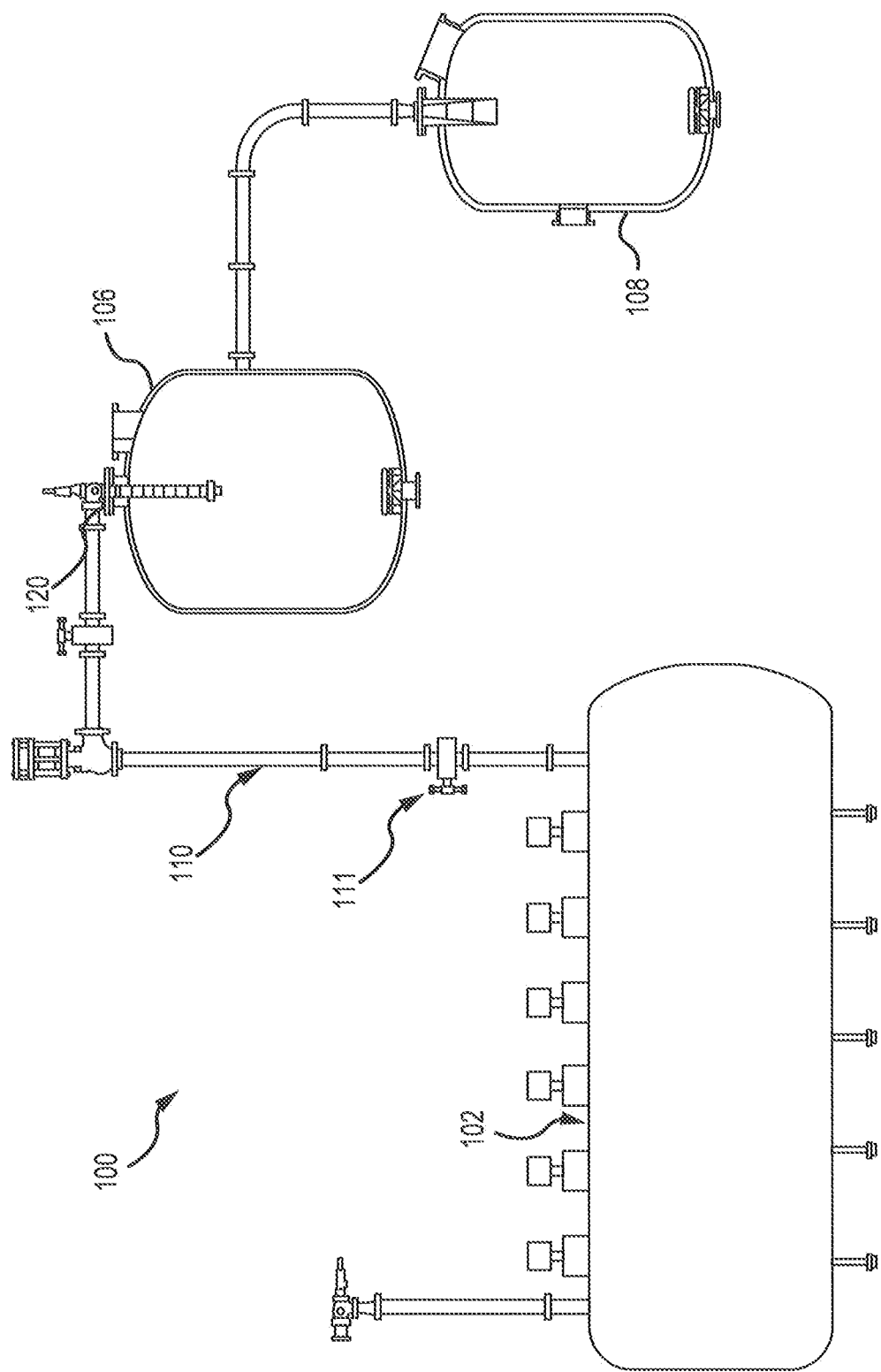
FIG. 1 illustrates an industrial process having a control valve in accordance with various embodiments.

A throttling or control valve may operate to regulate the flow of a fluid or slurry in a conduit. For example, with reference to FIG. 1, ore processing system 100 is illustrated. Ore processing system 100 may be used in connection with high pressure acid leaching ("HPAL"), pressure oxidation ("POX") or any other mining or industrial applications where a solvent is mixed with material containing one or more metals and subjected, for example, to at least one of elevated temperatures or pressures.

A mixture of solids, liquids, and/or gasses may be referred to as slurry, may be subjected to high temperatures and/or high pressures in autoclave 102. For example, ore may be mixed with strong acids (e.g. $H_2SO_4$) or strong bases (e.g., NaOH or $NH_3$) and may be subjected to temperatures of from 80° C. to 300° C. or greater and total pressures of from about 10 psi (~68 kPa) to 900 psi (~6,205 kPa). The slurry may have a pH below 1 to 4 (in an acidic application) or between about 10 to 14 (in a basic application). A throttling valve, such as a control valve 120, may be positioned between autoclave 102 and a high pressure flash tank 106, and may act to control the flow between the two components of ore processing system 100. Low pressure flash tank 108 is also illustrated for reference. Control valve 120 may be paired with isolation valve 111. Isolation valve 111 may be a ball valve, plug valve, or any other suitable valve.

Autoclave 102 may be sized according to industrial need, but is in various embodiments greater than 200 m³. The size of discharge line 110 may also vary, but is in various embodiments greater than 50 mm in diameter.

Control valve 120 may comprise an angle-type valve.

In other embodiments, control valve 120 can comprise a non-isolation valve, wherein control valve 120 is used to reduce or regulate pressure and/or flow. For example, control valve 120 can comprise a vent valve, a flash letdown valve, or a level control valve, among other types of valves.

In operation, control valve 120 may be actuated to a closed position to fluidly isolate flash tank 106 from autoclave 102. In response to actuation to an open position, control valve 120 may experience slurry flow at high velocities, temperatures and pressures as slurry flows from autoclave 102 to high pressure flash tank 106. Control valve 120 may thus experience corrosive and erosive conditions, combined with flow velocities approaching or exceeding the speed of sound, for the fluid at process conditions, for extended periods of time.

The intended material flowing through valve seat assembly, and the velocities at which such material is intended to flow, is important in valve design. In various embodiments, a slurry comprising a solid phase, liquid phase, and gas phase is intended to flow through valve seat assemblies. According to compressible flow theory and the thermodynamics of a multiphase system, the flow at the throat is choked and flowing at the local speed of sound, according to various embodiments. As the area expands, the velocity increases and the fluid density decreases.

Figure 2:
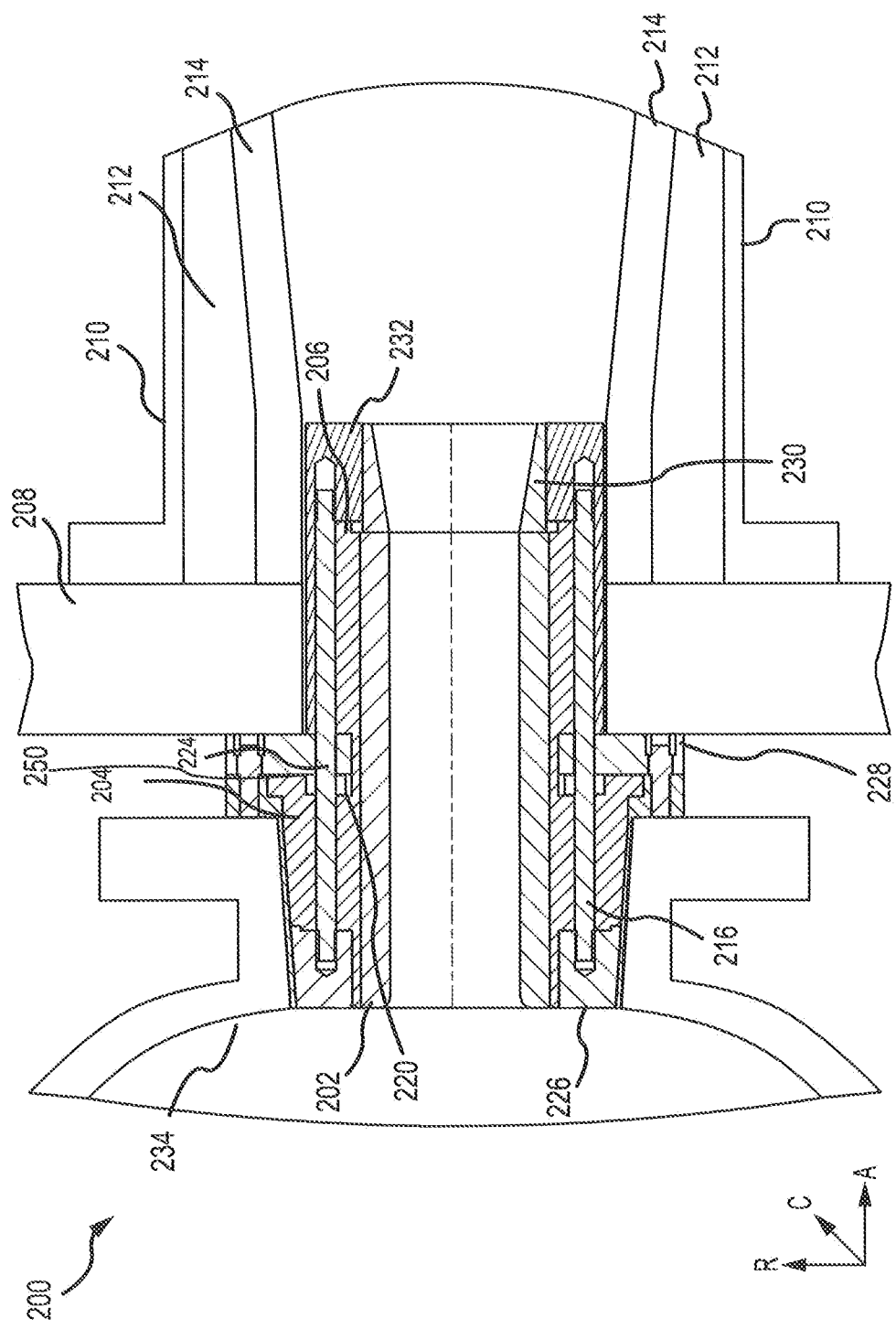
FIG. 2 illustrates a cross section view of a valve seat configuration in accordance with various embodiments.
Figure 3:
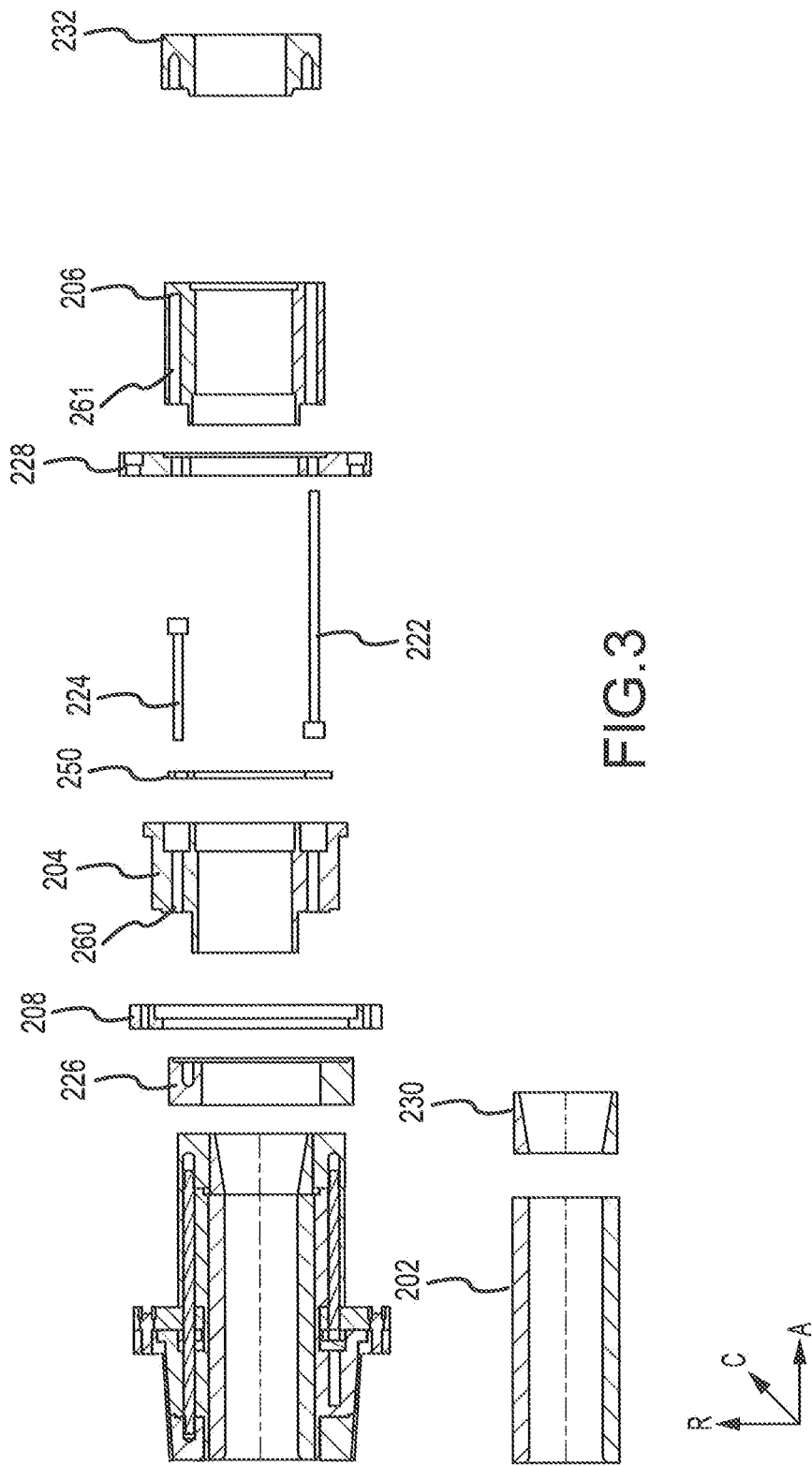
FIG. 3 illustrates an exploded cross section view of the valve seat assembly of FIG. 2, in accordance with various embodiments.

With reference to FIGS. 2 and 3, a valve seat assembly 200 is shown in cross section. Axial-Radial-Circumferential (A-R-C) axes are shown for convenience in this and other Figures. It should be noted that a first component shown displaced in a positive axial direction with respect to second component may be referred to as distal to the second component. Valve seat assembly 200 may be used in a variety of valve configurations, including in control valve 120 coupled to a flash tank 106, among others.

Valve seat assembly 200 may join valve body 234 to lid 208 and 210, where member 210 may comprise a blast tube or choke tube, pipe, or other vessel configured to receive flow from valve body 234. Valve body 234 and member 210 may comprise one or more metal materials, such as various metals and metal alloys as is known in the industry. A plug head may be configured to interface with seat liner 202 to regulate fluid flow from valve body 234 through valve seat assembly 200 and more specifically, through seat liner 202. Valve seat assembly 200 allows fluid communication between valve body 234, through lid 208, and into member 210.

In various embodiments, the plug head may comprise a ceramic material. Ceramics are especially well suited to high erosion applications. The plug head may have a varying geometry. For example, the geometry may be spherical, parabolic, flat, or any other suitable geometric configuration. There may further be a translating shaft coupled to the plug head. In various embodiments, the plug head can comprise one or more metals, such as, for example, various steel alloys, stainless steel, titanium, ceramics such as silicon carbide (SiC), boron carbide ($B_4C$), tungsten carbide (WC), and zirconia ($ZrO_2$), and nickel chromium alloys, such as an austenitic nickel-chromium alloy such as the austenitic nickel-chromium alloy sold under the trademark INCONEL. Nickel chromium alloys may be well suited to high temperature environments.

In various embodiments, seat liner 202 can comprise one or more ceramics such as silicon carbide (SiC), boron carbide ($B_4C$), tungsten carbide (WC), and zirconia ($ZrO_2$). Seat liner 202 is generally cylindrical in geometry, having a constant inner diameter (ID), though the inner diameter may taper from axial end to axial end in various embodiments. In various embodiments, seat liner 202 spans the axial length of valve seat assembly 200, however, as illustrated, seat liner 202 axially terminates at or near a distal portion of valve seat assembly 200 where seat liner 202 is coaxially or substantially coaxially aligned with seat end liner 230. Seat end liner 230 may comprises a tapered ID and constant outer diameter (OD). In that regard, the ID of seat end liner 230 is distally flared, meaning that the distal terminus has an ID greater than that of the proximal terminus that abuts, adjoins, or is otherwise disposed in proximity to seat liner 202.

Seat liner 202 is circumferentially at least partially surrounded by upper segment 204. Upper segment 204 interfaces with and/or contacts the OD surface of seat liner 202. In embodiments where seat end liner 230 is not present, upper segment 204 may interface with and/or contact seat liner 202. Upper segment 204 comprises a compliant material. In various embodiments, upper segment 204 may comprise one or more of thermoplastics and/or thermosets and/or polymeric materials. Compliant material include, for example, rubber, silicone, synthetic rubbers, polytetrafluoroethylene (PTFE), glass filled PTFE, expanded PTFE, and other similar materials. For example, upper segment 204 can comprise rigid or semi-rigid PTFE. In various embodiments, upper segment 204 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, upper segment 204 comprises a non-polymeric material, such as a silicon-based compound or a metallic material. For example, at elevated temperatures (such as, for example, above 260° C.) a silicon-based compound or metallic material may have a higher CTE, which may improve performance of upper segment 204 (as compared to the performance of a polymeric material at the same elevated temperature).

Upper retaining ring 226 is illustrated surrounding a proximal portion of the OD of upper segment 204, which in turn surrounds seat liner 202. Upper retaining ring 226 faces valve body 234 and thus benefits from construction from materials that tend to resist erosion and corrosion. Upper retaining ring 226 is thus disposed coaxial with respect to seat liner 202. Passing through upper segment 204 are bolts 216, which seat into upper retaining ring 226. Upper retaining ring 226 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL.

In various embodiments, since seat liner 202 comprises a ceramic material and valve body 234 and member 210 comprises a metal material, the different coefficients of thermal expansion (CTE) associated with these materials should be considered, since operating temperatures encountered may be substantially above room temperature and may approach between 100° C. to 250° C. or higher. In various embodiments, the ceramic material of seat liner 202 comprises a different coefficient of thermal expansion (CTE) than the metallic material of upper retaining ring 226. Accordingly, during operation, the metallic material of upper retaining ring 226 can linearly expand at a different rate and magnitude than the ceramic material of seat liner 202. In general, metals have higher coefficients of thermal expansion than ceramics, creating a difference in the overall expansion of seat liner 202 (which linearly expands relatively less) and upper retaining ring 226 (which linearly expands relatively more). For example, INCONEL alloys can range in coefficients of thermal expansion from approximately $13*10^{-6}$ mm/mm/° C. to approximately $16*10^{-6}$ mm/mm/° C., and fine ceramics can range in coefficients of thermal expansion from approximately $2*10^{-6}$ mm/mm/° C. to approximately $11*10^{-6}$ mm/mm/° C. Accordingly, the greater degree of linear expansion in the metal material of upper retaining ring 226 may produce a change in the load on seat liner 202, if seat liner 202 and upper retaining ring 226 were in direct contact. By employing upper segment 204 comprised of a compliant material with a higher CTE, such as PTFE and/or carbon filled PTFE as described herein, upper retaining ring 226 may slip with respect to seat liner 202 in an axial direction due to the reduced surface friction of upper segment 204, mitigating axial loads. Moreover, as upper retaining ring 226 expands radially in response to temperature change, upper segment 204 expands to a greater extent, sufficient to ensure contact of upper segment 204 with both seat liner 202 and upper retaining ring 226. In addition, ceramic materials, such as those that may be used in seat liner 202, may be relatively resistant to compression loads.

Expansion cavity 260 is formed into upper segment 204 and expansion cavity 261 is formed into lower segment 206 to allow for thermal expansion of the material of upper segment 204 and lower segment 206, respectively, that exceeds what is the available volume during exposure to high temperature environments. Expansion cavities 260, 261 may be formed in any suitable manner.

Bolt retaining ring 250 retains bolts 224, 216 as bolts 224, 216 pass through upper segment 204. Bolts 224, 216 are arranged circumferentially about upper segment 204. Lower seat flange 228 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL. Lower seat flange 228 comprises a ring circumferentially surrounding seat liner 202 and providing a transition from upper segment 204 to lower segment 206.

Seat liner 202 is circumferentially at least partially surrounded by lower segment 206. Lower segment 206 interfaces with and/or contacts the OD surface of seat liner 202. Lower segment 206 comprises a compliant material. In various embodiments, lower segment 206 may comprise one or more of thermoplastics and/or thermosets and/or polymeric materials. Compliant material include, for example, rubber, silicone, synthetic rubbers, polytetrafluoroethylene (PTFE), carbon filled, glass filled, expanded PTFE, and other similar materials. For example, lower segment 206 can comprise rigid or semi-rigid PTFE. In various embodiments, lower segment 206 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, lower segment 206 comprises a non-polymeric material, such as a silicon-based compound or a metallic material. For example, at elevated temperatures (such as, for example, above 260° C., a silicon-based compound or metallic material may have a higher CTE, which may improve performance of lower segment 206 (as compared to the performance of a polymeric material at the same elevated temperature).

Lower retaining ring 232 is illustrated surrounding at least a distal portion of the OD of seat end liner 230. Lower retaining ring 232 faces member 210 and thus benefits from construction from materials that tend to resist erosion and corrosion. Lower retaining ring 232 is thus disposed coaxial with respect to seat liner 202 and seat end liner end. Passing through lower seat flange 228 are bolts 222 which seat into lower retaining ring 232. Lower retaining ring 232 is disposed to prevent linear expansion of lower segment 206, for example. Moreover, lower retaining ring 232 may comprise one or more cavities that accept expansion of lower segment 206 at temperatures above room temperature. Lower retaining ring 232 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL.

Seat end liner 230 opens distally into a cavity defined by blast tube liner 214. Blast tube liner 214 is surrounded by or at least partially surrounded by blast tube 212 which in turn is surrounded by or at least partially surrounded by member 210. Blast tube liner 214 is shown having an inner diameter (ID) greater than that of seat end liner 230, and lower retaining ring 232. In that regard, there is a radial step that is created so mass flow through seat end liner 230 will transition to the space defined by blast tube liner 214, which can have a greater cross sectional area than seat end liner 230. Seat end liner 230 may be interference fit within, and coaxial to, lower retaining ring 232.

In such a configuration, upper segment 204 and lower segment 206 operate to hold the seat liner 202 in place, even at the elevated operating temperatures described herein. Moreover, upper segment 204 and lower segment 206 provide an assembly stress limiting layer between the seat liner 202, valve body 234, lid 208, and blast tube liner 214. and the retaining components 226 and 232. The compliant nature of upper segment 204 and lower segment 206 limits loading on the seat liner 202 as the valve seat assembly 200 is exposed to varying temperatures and other types of forces. Moreover, upper segment 204 and lower segment 206 provide thermal insulation between various metallic parts of the valve seat lining 202, reducing heat transfer and potentially reducing thermal stress while reducing weight. The compliant nature of upper segment 204 and lower segment 206 allows for a ceramic seat liner 202 and seat end liner 230 that are less finely finished than would otherwise be needed. In other words, seat liner 202 need not be polished or ground on the parts of the OD surface that interface with segments 204 and 206. In various embodiments, ceramic seat liner 202 and/or seat end liner 230 may be used in an "as fired" state, meaning no or minimal grinding or sanding is performed after firing.

Figure 4:
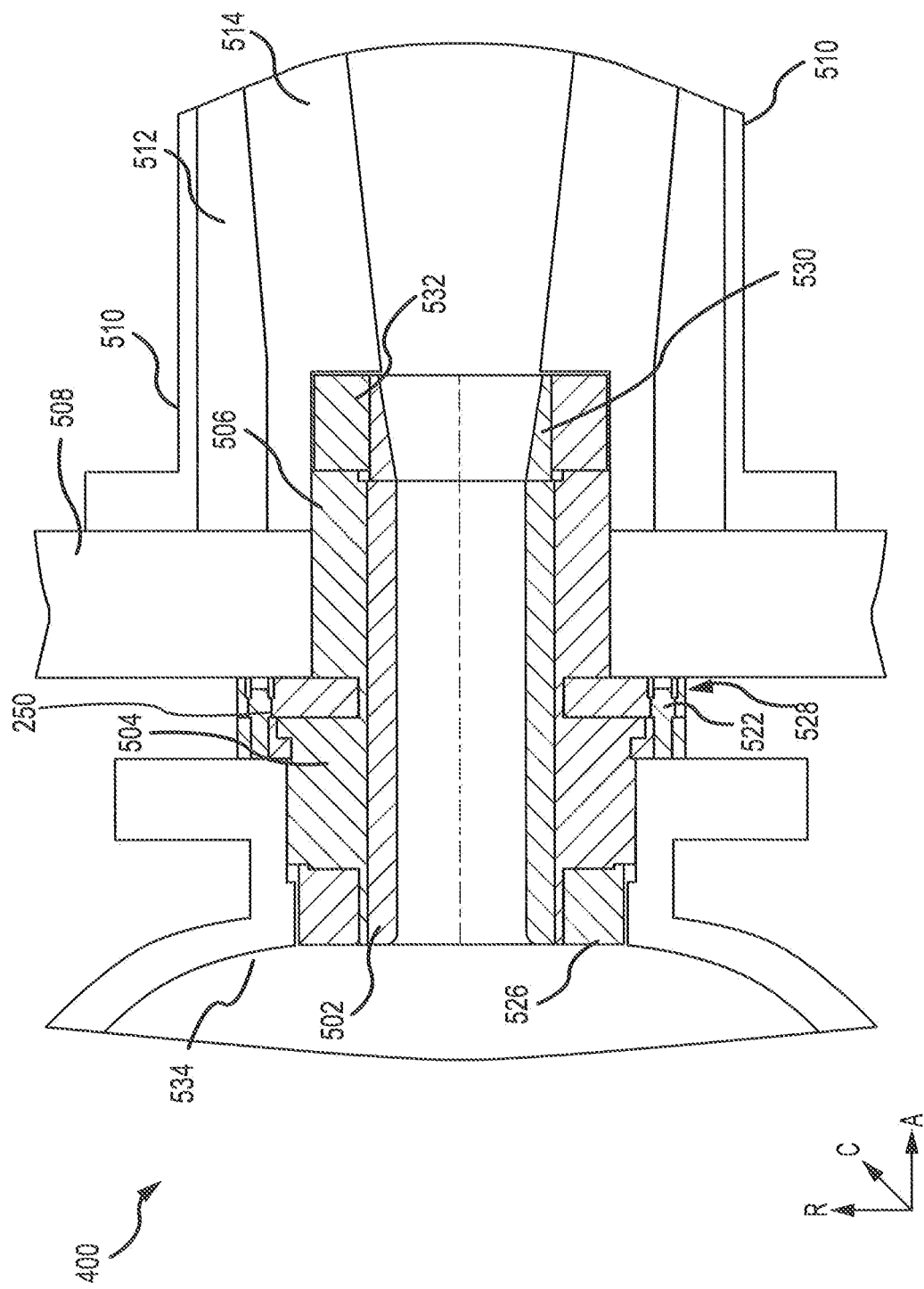
FIG. 4 illustrates a cross section view of a valve seat configuration in accordance with various embodiments.
Figure 5:
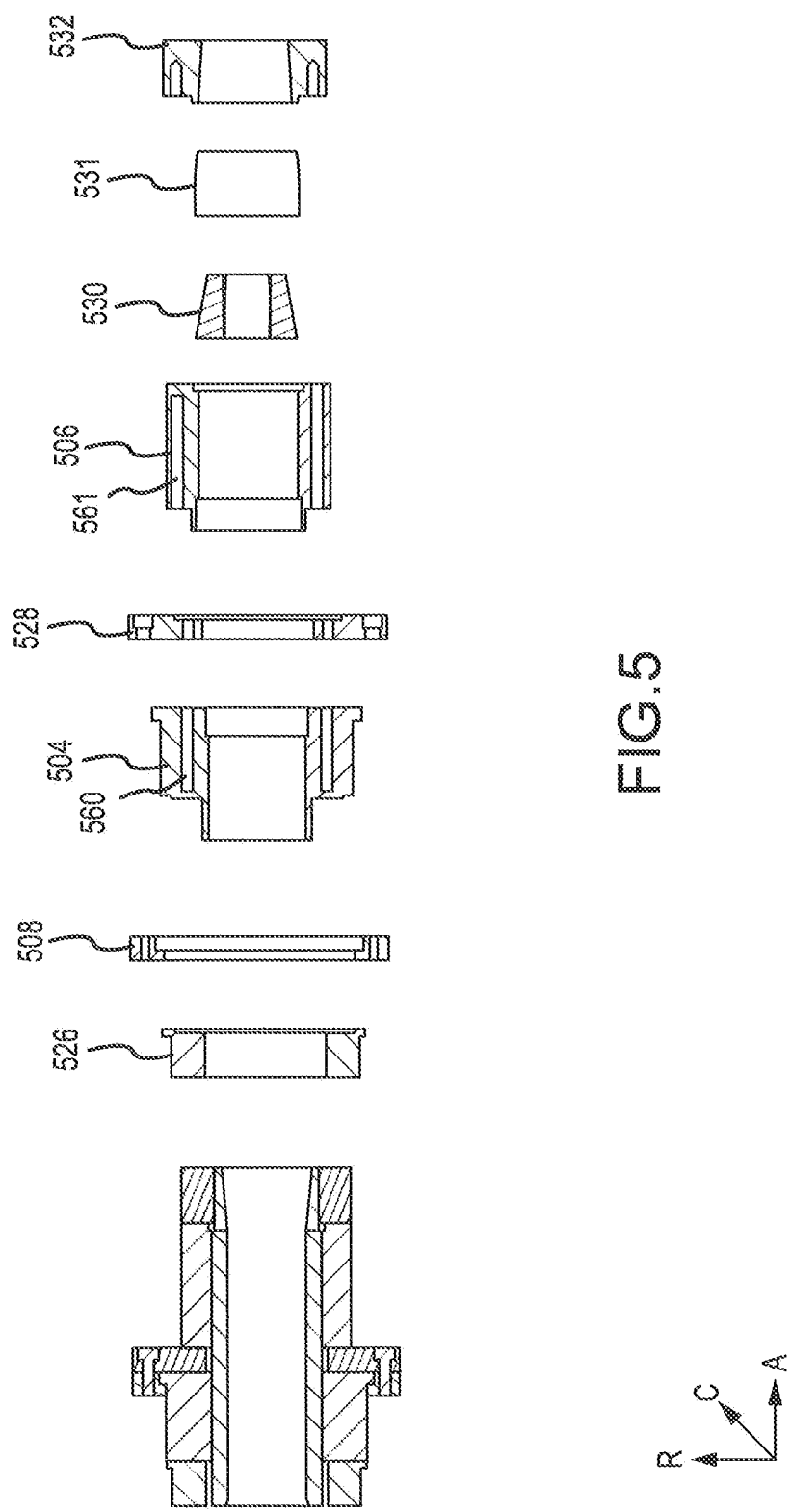
FIG. 5 illustrates an exploded cross section view of the valve seat assembly of FIG. 4, in accordance with various embodiments.

With reference to FIGS. 4 and 5, a valve seat assembly 400 is shown in cross section. Valve seat assembly 400 may be used in a variety of valve configurations, including in control valve 120, among others.

Valve seat assembly 400 may join valve body 534 to lid 508 and 510, where member 510 may comprise a tank, pipe, or other vessel configured to receive flow from valve body 534. Valve body 534 and member 510 may comprise one or more metal materials, such as various metals and metal alloys as is known in the industry. A plug head may be configured to interface with seat liner 502 to prevent mass flow from valve body 534 through valve seat assembly 400 and more specifically, through seat liner 502. Valve seat assembly 400 allows fluid communication between valve body 534, through lid 508, and into member 510. Moreover, valve body 534 features a shoulder to limit linear expansion in response to temperatures higher than room temperature.

In various embodiments, the plug head may comprise a ceramic material. Ceramics are especially well suited to high erosion applications. The plug head may have a varying geometry. For example, the geometry may be spherical, parabolic, flat, or any other suitable geometric configuration. There may further be a translating shaft coupled to the plug head. In various embodiments, the plug head can comprise one or more metals, such as, for example, various steel alloys, stainless steel, titanium, ceramics such as silicon carbide (SiC), boron carbide ($B_4C$), tungsten carbide (WC), and zirconia ($ZrO_2$), and nickel chromium alloys, such as an austenitic nickel-chromium alloy such as the austenitic nickel-chromium alloy sold under the trademark INCONEL. Nickel chromium alloys may be well suited to high temperature environments.

In various embodiments, seat liner 502 can comprise one or more ceramics such as silicon carbide (SiC), boron carbide ($B_4C$), tungsten carbide (WC), and zirconia ($ZrO_2$). Seat liner 502 is generally cylindrical in geometry, having a constant inner diameter (ID), though the inner diameter may taper from axial end to axial end in various embodiments. In various embodiments, seat liner 502 spans the axial length of valve seat assembly 400, however, as illustrated, seat liner 502 axially terminates at or near a distal portion of valve seat assembly 400 where seat liner 502 is coaxially or substantially coaxially aligned with seat end liner 530. Seat end liner 530 can comprise a tapered ID and constant outer diameter (OD). In that regard, the ID of seat end liner 530 can be distally flared, meaning that the distal terminus has an ID greater than that of the proximal terminus that abuts, adjoins, or is otherwise disposed in proximity to seat liner 502. Sleeve 531 may be disposed between seat end liner 530 and lower retaining ring 532.

Seat liner 502 is circumferentially at least partially surrounded by upper segment 504. Segments 504 and 506 interfaces with and/or contacts the OD surface of seat liner 502. Upper segment 504 comprises a compliant material. In various embodiments, upper segment 504 may comprise one or more of thermoplastics and/or thermosets and/or polymeric materials. Compliant material include, for example, rubber, silicone, synthetic rubbers, polytetrafluoroethylene (PTFE), carbon filled, glass filled, expanded PTFE, and other similar materials. For example, upper segment 504 can comprise rigid or semi-rigid PTFE. In various embodiments, upper segment 504 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, upper segment 504 comprises a non-polymeric material, such as a silicon-based compound or a metallic material. For example, at elevated temperatures (such as, for example, above 260° C.) a silicon-based compound or metallic material may have a higher CTE, which may improve performance of upper segment 504 (as compared to the performance of a polymeric material at the same elevated temperature).

Upper retaining ring 526 is illustrated surrounding a proximal portion of the OD of upper segment 504, which in turn surrounds seat liner 502. Upper retaining ring 526 faces valve body 534 and thus benefits from construction from materials that tend to resist erosion and corrosion. Upper retaining ring 526 is thus disposed coaxial with respect to seat liner 502. Upper retaining ring 526 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL.

In various embodiments, since seat liner 502 comprises a ceramic material and valve body 534 and member 510 comprise a metal material, the different coefficients of thermal expansion (CTE) associated with these materials should be considered, since operating temperatures encountered may be substantially above room temperature and may approach between 100° C. to 250° C. or higher. In various embodiments, the ceramic material of seat liner 502 comprises a different coefficient of thermal expansion (CTE) than the metallic material of upper retaining ring 526. Accordingly, during operation, the metallic material of upper retaining ring 526 can linearly expand at a different rate than the ceramic material of seat liner 502. In general, metals have higher coefficients of thermal expansion than ceramics, creating a difference in the overall expansion of seat liner 502 (which linearly expands relatively less) and upper retaining ring 526 (which linearly expands relatively more). For example, INCONEL alloys can range in coefficients of thermal expansion from approximately $13*10^{-6}$ mm/mm/° C. to approximately $16*10^{-6}$ mm/mm/° C., and fine ceramics can range in coefficients of thermal expansion from approximately $2*10^{-6}$ mm/mm/° C. to approximately $11*10^{-6}$ mm/mm/° C. Accordingly, the greater degree of linear expansion in the metal material of upper retaining ring 526 may produce a load on seat liner 502, if seat liner 502 and upper retaining ring 526 were in direct contact. By employing segment 504 and 506 comprised of a compliant material with a higher CTE, such as PTFE and/or carbon filled PTFE as described herein, upper retaining ring 526 may slip with respect to seat liner 502 in an axial direction due to the reduced surface friction of upper segment 504 and 506, mitigating loads. Moreover, as upper retaining ring 526 expands radially in response to temperature change, upper segment 504 and 506 expands to a greater extent, sufficient to ensure contact of upper segment 504 with both seat liner 502 and upper retaining ring 526, valve body 534, lid 508, and blast tube liner 514. In addition, ceramic materials, such as those that may be used in seat liner 502, may be relatively resistant to compression loads.

Lower seat flange 528 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL. Lower seat flange 528 comprises a ring circumferentially surrounding seat liner 502 and providing a transition from upper segment 504 to lower segment 506.

Seat liner 502 is circumferentially at least partially surrounded by lower segment 506. Lower segment 506 interfaces with and/or contacts the top surface of seat end liner 530. Lower segment 506 comprises a compliant material. In various embodiments, lower segment 506 may comprise one or more of thermoplastics and/or thermosets and/or polymeric materials. Compliant material include, for example, rubber, silicone, synthetic rubbers, polytetrafluoroethylene (PTFE), carbon filled PTFE, glass filled expanded PTFE, and other similar materials. For example, lower segment 506 can comprise rigid or semi-rigid PTFE. In various embodiments, lower segment 506 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, lower segment 506 comprises a non-polymeric material, such as a silicon-based compound or a metallic material. For example, at elevated temperatures (such as, for example, above 260° C., a silicon-based compound or metallic material may have a higher CTE, which may improve performance of lower segment 506 (as compared to the performance of a polymeric material at the same elevated temperature).

Expansion cavity 560 is formed into upper segment 504 and expansion cavity 561 is formed into lower segment 506 to allow for thermal expansion of the material of upper segment 504 and lower segment 506, respectively, that exceeds what is the available volume during exposure to high temperature environments. Expansion cavities 560, 561 may be formed in any suitable manner.

Lower retaining ring 532 is illustrated surrounding at least a distal portion of the OD of seat end liner 530. Lower retaining ring 532 faces blast tube liner 514 and thus benefits from construction from materials that tend to resist erosion and corrosion. Lower retaining ring 532 is thus disposed coaxial with respect to seat liner 502 and seat end liner 530. Lower retaining ring 532 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL.

Seat end liner 530 opens distally into a cavity defined by blast tube liner 514. Blast tube liner 514 is surrounded by or at least partially surrounded by blast tube 512 which in turn is surrounded by or at least partially surrounded by member 510. Blast tube liner 514 is shown having a minimum inner diameter (ID) equal to or substantially equal to, where the term "substantially" in this context only means+/−5%, of the diameter of the ID of the distal-most portion of the ceramic seat end liner 530. In that regard, there is little to no radial step that is created between the major ID of 530 and the minor ID of 514. Blast tube liner 514 may also comprise a diameter that expands so mass flow through seat end liner 530 will transition to the space defined by blast tube liner 514, which can have a greater cross sectional areas than seat end liner 530. Lower retaining ring 532 may be interference fit around and coaxial to seat end liner 530. However, as illustrated, lower retaining ring 532, sleeve 531 and seat end liner 530 are coupled via a tapered fit.

In such a configuration, upper segment 504 and lower segment 506 operate to hold the seat liner 502 and seat end liner 530 in place, even at the elevated operating temperatures described herein. Moreover, upper segment 504 and lower segment 506 provide an assembly stress limiting layer between the seat liner 502, and the retaining components 534, 508, and 514. The compliant nature of upper segment 504 and lower segment 506 limits loading on the seat liner 502 as the valve seat assembly 400 is exposed to varying temperatures and other types of forces. Moreover, upper segment 504 and lower segment 506 provide thermal insulation to various metallic parts of the valve seat assembly, reducing heat transfer and potentially reducing thermal stress while reducing weight. The compliant nature of upper segment 504 and lower segment 506 allows for a ceramic seat liner 502 and seat end liner 530 that are less finely finished than would otherwise be needed. In other words, seat liner 502 and seat end liner 530 need not be polished, ground, sanded, or otherwise machined on the parts of the OD surface that interface with upper segment 504 and lower segment 506, and lower retaining ring 532. In various embodiments, ceramic seat liner 502 and/or seat end liner 530 may be used in an "as fired" state, meaning no grinding or sanding is performed after firing.

Figure 6:
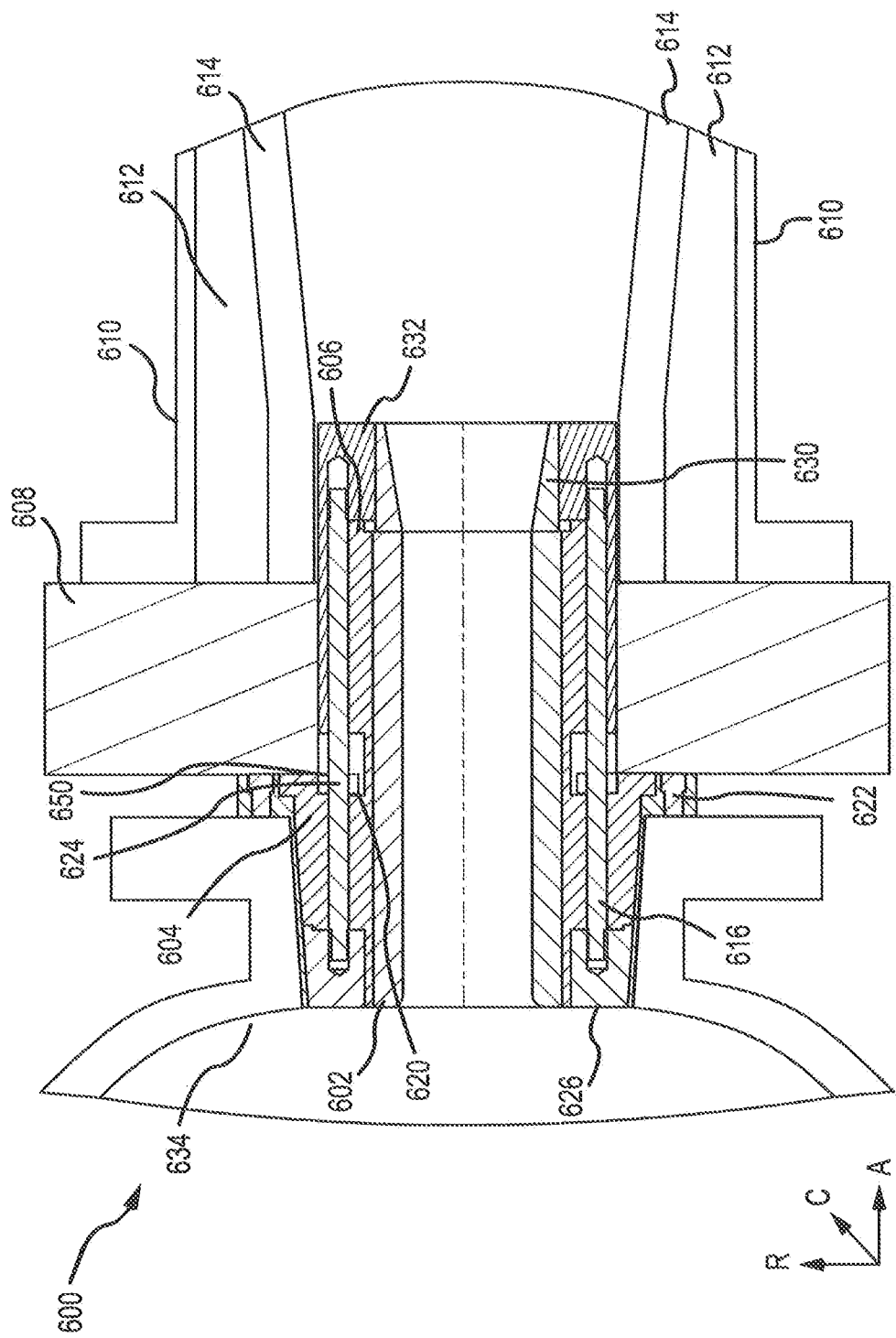
FIG. 6 illustrates a cross section view of a valve seat configuration in accordance with various embodiments.
Figure 7:
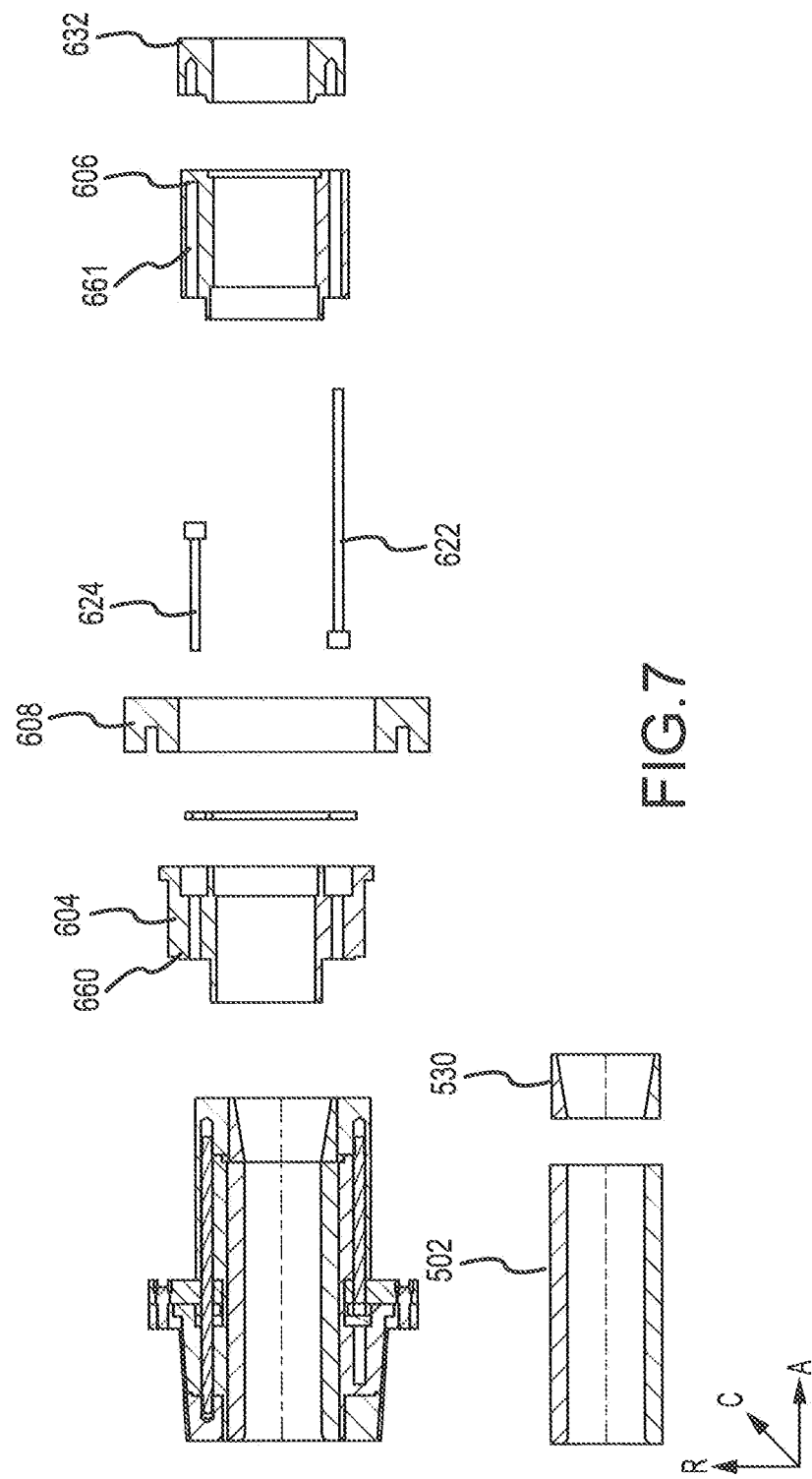
FIG. 7 illustrates an exploded cross section view of the valve seat assembly of FIG. 5, in accordance with various embodiments.

With reference to FIGS. 6 and 7, a valve seat assembly 600 is shown in cross section. Valve seat assembly 600 may be used in a variety of valve configurations, including in control valve 120 coupled to high pressure flash tank 106, among others.

Valve seat assembly 600 may join valve body 634 to member 610, where member 610 may comprise a blast tube or choke tube, pipe, or other vessel configured to receive flow from valve body 634. Valve body 634 and member 610 may comprise one or more metal materials, such as various metals and metal alloys as is known in the industry. A plug head may be configured to interface with seat liner 602 to regulate fluid flow from valve body 634 through valve seat assembly 600 and more specifically, through seat liner 602. Valve seat assembly 600 allows fluid communication between valve body 634, through annular flange 608, and into blast tube liner 614.

In various embodiments, the plug head may comprise a ceramic material. Ceramics are especially well suited to high erosion applications. The plug head may have a varying geometry. For example, the geometry may be spherical, parabolic, flat, or any other suitable geometric configuration. There may further be a translating shaft coupled to the plug head. In various embodiments, the plug head can comprise one or more metals, such as, for example, various steel alloys, stainless steel, titanium, ceramics such as silicon carbide (SiC), boron carbide ($B_4C$), tungsten carbide (WC), and zirconia ($ZrO_2$), and nickel chromium alloys, such as an austenitic nickel-chromium alloy such as the austenitic nickel-chromium alloy sold under the trademark INCONEL. Nickel chromium alloys may be well suited to high temperature environments.

In various embodiments, seat liner 602 can comprise one or more ceramics such as silicon carbide (SiC), boron carbide ($B_4C$), tungsten carbide (WC), and zirconia ($ZrO_2$). Seat liner 602 is generally cylindrical in geometry, having a constant inner diameter (ID), though the inner diameter may taper from axial end to axial end in various embodiments. In various embodiments, seat liner 602 spans the axial length of valve seat assembly 600, however, as illustrated, seat liner 602 axially terminates at or near a distal portion of valve seat assembly 600 where seat liner 602 is coaxially or substantially coaxially aligned with seat end liner 630. Seat end liner 630 may comprises a tapered ID and constant outer diameter (OD). In that regard, the ID of seat end liner 630 is distally flared, meaning that the distal terminus has an ID greater than that of the proximal terminus that abuts, adjoins, or is otherwise disposed in proximity to seat liner 602.

Seat liner 602 is circumferentially at least partially surrounded by upper segment 604. Upper segment 604 interfaces with and/or contacts the OD surface of seat liner 602. In embodiments where seat end liner 630 is not present, upper segment 604 may interface with and/or contact seat liner 602. Upper segment 604 comprises a compliant material. In various embodiments, upper segment 604 may comprise one or more of thermoplastics and/or thermosets and/or polymeric materials. Compliant material include, for example, rubber, silicone, synthetic rubbers, polytetrafluoroethylene (PTFE), glass filled PTFE, expanded PTFE, and other similar materials. For example, upper segment 204 can comprise rigid or semi-rigid PTFE. In various embodiments, upper segment 204 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, upper segment 604 comprises a non-polymeric material, such as a silicon-based compound or a metallic material. For example, at elevated temperatures (such as, for example, above 260° C.) a silicon-based compound or metallic material may have a higher CTE, which may improve performance of upper segment 604 (as compared to the performance of a polymeric material at the same elevated temperature).

Upper retaining ring 626 is illustrated surrounding a proximal portion of the OD of upper segment 604, which in turn surrounds seat liner 602. Upper retaining ring 626 faces valve body 634 and thus benefits from construction from materials that tend to resist erosion and corrosion. Upper retaining ring 626 is thus disposed coaxial with respect to seat liner 602. Passing through upper segment 604 are bolts 616, which seat into upper retaining ring 626. Upper retaining ring 626 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL.

In various embodiments, since seat liner 602 comprises a ceramic material and valve body 634 and member 610 comprises a metal material, the different coefficients of thermal expansion (CTE) associated with these materials should be considered, since operating temperatures encountered may be substantially above room temperature and may approach between 100° C. to 250° C. or higher. In various embodiments, the ceramic material of seat liner 602 comprises a different coefficient of thermal expansion (CTE) than the metallic material of upper retaining ring 626. Accordingly, during operation, the metallic material of upper retaining ring 626 can linearly expand at a different rate and magnitude than the ceramic material of seat liner 602. In general, metals have higher coefficients of thermal expansion than ceramics, creating a difference in the overall expansion of seat liner 602 (which linearly expands relatively less) and upper retaining ring 626 (which linearly expands relatively more). For example, INCONEL alloys can range in coefficients of thermal expansion from approximately $13*10^{-6}$ mm/mm/° C. to approximately $16*10^{-6}$ mm/mm/° C., and fine ceramics can range in coefficients of thermal expansion from approximately $2*10^{-6}$ mm/mm/° C. to approximately $11*10^{-6}$ mm/mm/° C. Accordingly, the greater degree of linear expansion in the metal material of upper retaining ring 626 may produce a load on seat liner 602, if seat liner 602 and upper retaining ring 626 were in direct contact. By employing upper segment 604 comprised of a compliant material with a higher CTE, such as PTFE and/or carbon filled PTFE as described herein, upper retaining ring 626 may slip with respect to seat liner 602 in an axial direction due to the reduced surface friction of upper segment 604, mitigating axial loads. Moreover, as upper retaining ring 626 expands radially in response to temperature change, upper segment 604 expands to a greater extent, sufficient to ensure contact of upper segment 604 with both seat liner 602 and upper retaining ring 626. In addition, ceramic materials, such as those that may be used in seat liner 602, may be relatively resistant to compression loads.

Expansion cavity 660 is formed into upper segment 604 and expansion cavity 661 is formed into lower segment 606 to allow for thermal expansion of the material of upper segment 604 and lower segment 606, respectively, that exceeds what is the available volume during exposure to high temperature environments. Expansion cavities 660, 661 may be formed in any suitable manner.

Bolt retaining ring 650 retains bolts 624, 616 as bolts 624, 616 pass through upper segment 604. Bolts 624, 616 are arranged circumferentially about upper segment 604.

Annular flange 608 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL. Annular flange 608 comprises a ring circumferentially surrounding seat liner 602 and providing a transition from upper segment 604 to lower segment 606.

Figure 8:
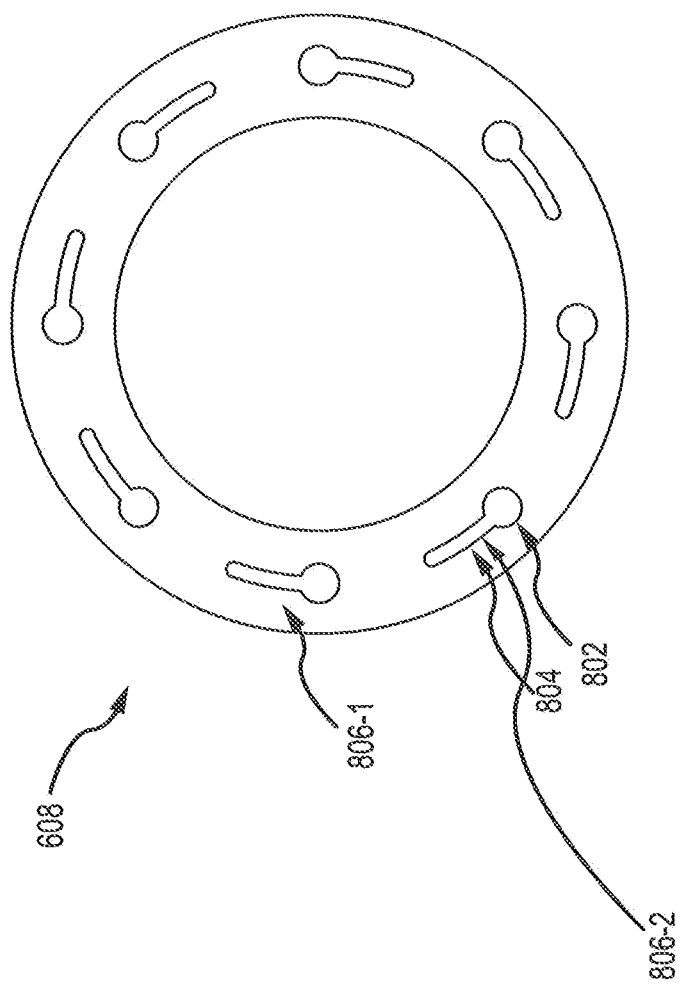
FIG. 8 illustrates a view of an annular flange, in accordance with various embodiments.

With momentary reference to FIG. 8, annular flange 608 is depicted. Apertures 806 (e.g., 806-1, 806-2, etc) are disposed circumferentially about annular flange 608. One or more of apertures 806 may be comprise a "keyhole" geometry. Stated another way, aperture 806-2 comprises bolt receiving portion 802 and circumferential slot portion 804. In this manner, bolts 624, 616 may be disposed through circumferential slot portion 804 and rotated so that the heads of bolts 624, 616 at least partially align with bolt receiving portion 802. Bolts 624, 616 may then be secured. By using a large annular flange 608, a reduction in part count is achieved, in addition to an ability to use larger bolts that may offer greater durability.

Seat liner 602 is circumferentially at least partially surrounded by lower segment 606. Lower segment 606 interfaces with and/or contacts the OD surface of seat liner 602. Lower segment 606 comprises a compliant material. In various embodiments, lower segment 606 may comprise one or more of thermoplastics and/or thermosets and/or polymeric materials. Compliant material include, for example, rubber, silicone, synthetic rubbers, polytetrafluoroethylene (PTFE), carbon filled, glass filled, expanded PTFE, and other similar materials. For example, lower segment 606 can comprise rigid or semi-rigid PTFE. In various embodiments, lower segment 606 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, lower segment 606 comprises a non-polymeric material, such as a silicon-based compound or a metallic material. For example, at elevated temperatures (such as, for example, above 260° C., a silicon-based compound or metallic material may have a higher CTE, which may improve performance of lower segment 606 (as compared to the performance of a polymeric material at the same elevated temperature).

Lower retaining ring 632 is illustrated surrounding at least a distal portion of the OD of seat end liner 630. Lower retaining ring 632 faces member 610 and thus benefits from construction from materials that tend to resist erosion and corrosion. Lower retaining ring 632 is thus disposed coaxial with respect to seat liner 602 and seat end liner end. Passing through annular flange 608 are bolts 622 which seat into lower retaining ring 632. Lower retaining ring 632 is disposed to prevent linear expansion of lower segment 606, for example. Moreover, lower retaining ring 632 may comprise one or more cavities that accept expansion of lower segment 606 at temperatures above room temperature. Lower retaining ring 632 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL.

Seat end liner 630 opens distally into a cavity defined by blast tube liner 614. Blast tube liner 614 is surrounded by or at least partially surrounded by blast tube 612 which in turn is surrounded by or at least partially surrounded by member 610. Blast tube liner 614 is shown having an inner diameter (ID) greater than that of seat end liner 630, and lower retaining ring 632. In that regard, there is a radial step that is created so mass flow through seat end liner 630 will transition to the space defined by blast tube liner 614, which can have a greater cross sectional area than seat end liner 630. Seat end liner 630 may be interference fit within, and coaxial to, lower retaining ring 632.

In such a configuration, upper segment 604 and lower segment 606 operate to hold the seat liner 602 in place, even at the elevated operating temperatures described herein. Moreover, upper segment 604 and lower segment 606 provide an assembly stress limiting layer between the seat liner 602, valve body 634, annular flange 608, and blast tube liner 614. and the retaining components 626 and 632. The compliant nature of upper segment 604 and lower segment 606 limits loading on the seat liner 602 as the valve seat assembly 600 is exposed to varying temperatures and other types of forces. Moreover, upper segment 604 and lower segment 606 provide thermal insulation between various metallic parts of the valve seat liner 602, reducing heat transfer and potentially reducing thermal stress while reducing weight. The compliant nature of upper segment 604 and lower segment 606 allows for a ceramic seat liner 602 and seat end liner 630 that are less finely finished than would otherwise be needed. In other words, seat liner 602 need not be polished or ground on the parts of the OD surface that interface with segments 604 and 606. In various embodiments, ceramic seat liner 602 and/or seat end liner 630 may be used in an "as fired" state, meaning no or minimal grinding or sanding is performed after firing.

Figure 9:
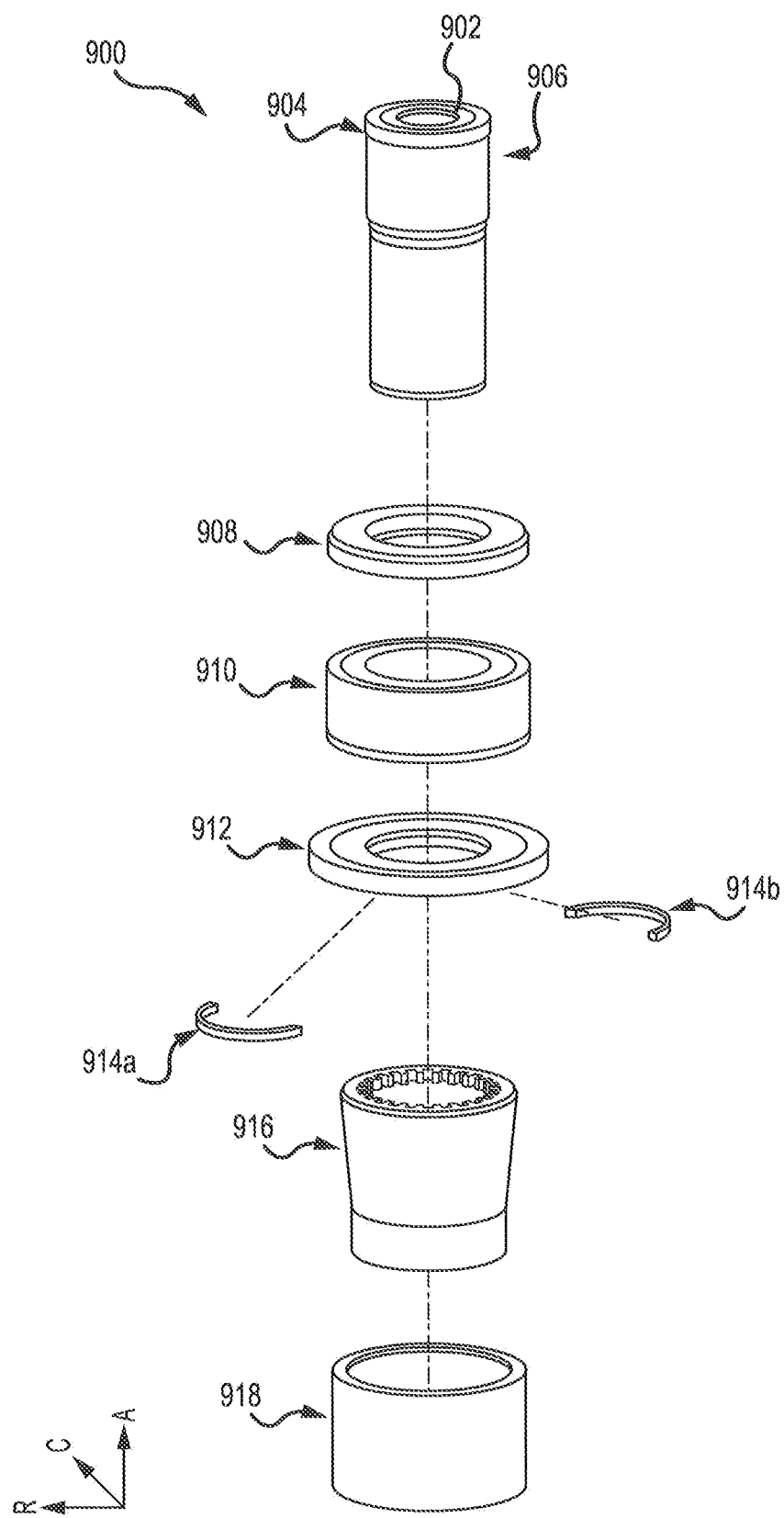
FIG. 9 illustrates an exploded view of a valve seat assembly, in accordance with various embodiments.
Figure 10A:
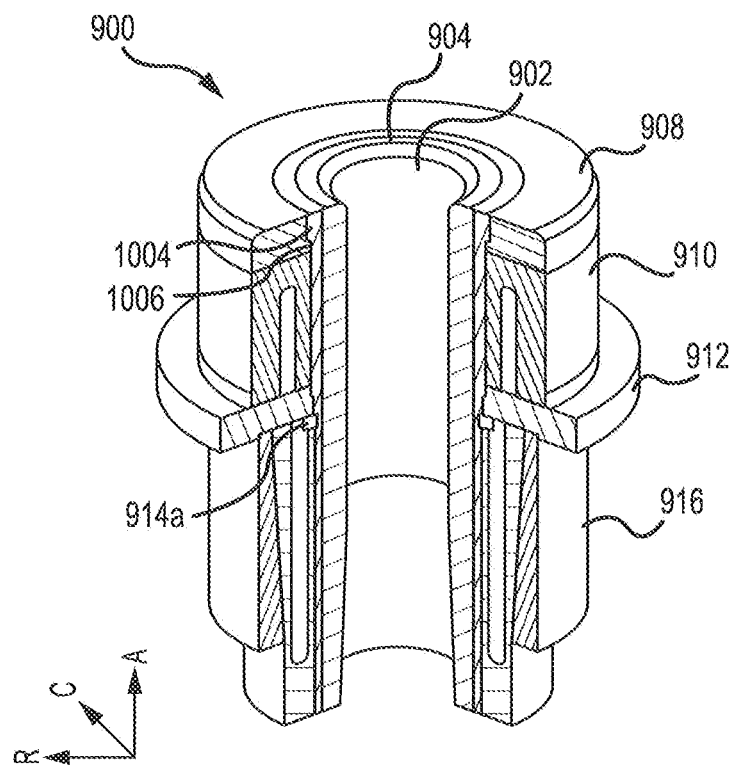
FIGS. 10A and 10B illustrate a cross section view of the valve seat assembly of FIG. 9, in accordance with various embodiments
Figure 10B:
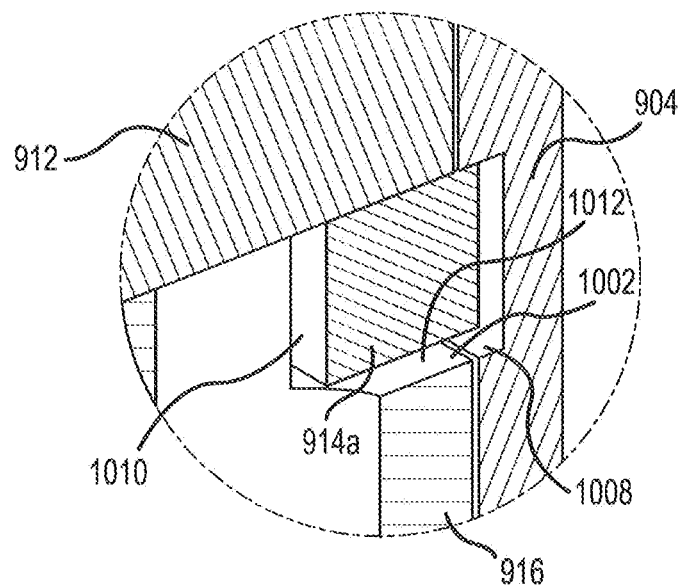

With reference to FIGS. 9, 10A and 10B, a valve seat assembly 900 is illustrated in an exploded view and in cross section as assembled. Axial-Radial-Circumferential (A-R-C) axes are shown for convenience in this and other Figures. Valve seat assembly 900 may be used in a variety of valve configurations, including in control valve 120 coupled to a flash tank 106, among others.

Valve seat assembly 900 may join a valve body to a blast tube or choke tube, pipe, or other vessel configured to receive flow from the valve body. The valve body and the blast tube, choke tube or pipe may comprise one or more metal materials, such as various metals and metal alloys as is known in the industry. A plug head may be configured to interface with seat liner 902 to regulate fluid flow from the valve body through valve seat assembly 900 and more specifically, through seat liner 902. Valve seat assembly 900 allows fluid communication between a valve body 234 and into the blast tube, choke tube or pipe.

In various embodiments, the plug head may comprise a ceramic material. Ceramics are especially well suited to high erosion applications. The plug head may have a varying geometry. For example, the geometry may be spherical, parabolic, flat, or any other suitable geometric configuration. There may further be a translating shaft coupled to the plug head. In various embodiments, the plug head can comprise one or more metals, such as, for example, various steel alloys, stainless steel, titanium, ceramics such as silicon carbide (SiC), boron carbide ($B_4C$), tungsten carbide (WC), and zirconia ($ZrO_2$), and nickel chromium alloys, such as an austenitic nickel-chromium alloy such as the austenitic nickel-chromium alloy sold under the trademark INCONEL. Nickel chromium alloys may be well suited to high temperature environments.

In various embodiments, seat liner 902 can comprise one or more ceramics such as silicon carbide (SiC), boron carbide ($B_4C$), tungsten carbide (WC), and zirconia ($ZrO_2$). Seat liner 902 is generally cylindrical in geometry, having a constant inner diameter (ID), though the inner diameter may taper from axial end to axial end in various embodiments. In various embodiments, seat liner 902 spans the axial length of valve seat assembly 900, however, as illustrated, seat liner 902 axially terminates at or near a distal portion of valve seat assembly 900 where seat liner 902 is coaxially or substantially coaxially aligned with end ring 918.

Seat liner 902 is circumferentially at least partially surrounded by upper segment seat liner housing 904. Seat liner housing 904 is disposed coaxially or substantially coaxially to seat liner 902. Seat liner housing 904 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL. In various embodiments, seat liner housing 904 is press fit or interference fit with seat liner 902. In that regard, seat liner housing 904 may be heated and allowed to expand and then disposed coaxial to seat liner 902. Upon cooling, seat liner housing 904 may fit tightly to seat liner 902 and may exert a radial compressive force to seat liner 902. With momentary reference to FIG. 10A, seat liner housing 904 has radial step 1006. Radial step 1006 is an area of increased radial thickness at one terminus of seat liner housing 904. Radial step 1006 interacts with radial extension 1004 of end collar 908 to prevent seat liner housing 904 from axial movement in the positive A axis. In that regard, the interaction of radial step 1006 with radial extension 1004 axially fixes seat liner housing 904 from movement in the positive A direction. Seat liner housing 904 and seat liner 902 may collectively be referred to as seat liner assembly 906.

End collar 908 is disposed coaxially or substantially coaxially to seat liner assembly 906. End collar is configured to be flush or substantially flush with seat liner assembly 906. In that regard, the terminal portions of end collar 908 and seat liner assembly 906 may be disposed in the same plane or substantially the same plane when in the assembled state. End collar 908 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL.

Seat liner assembly 906 is circumferentially at least partially surrounded by upper segment 910. Upper segment 910 interfaces with and/or contacts the OD surface of seat liner assembly 906. Upper segment 910 comprises a compliant material. In various embodiments, upper segment 910 may comprise one or more of thermoplastics and/or thermosets and/or polymeric materials. Compliant material include, for example, rubber, silicone, synthetic rubbers, polytetrafluoroethylene (PTFE), glass filled PTFE, expanded PTFE, and other similar materials. For example, upper segment 910 can comprise rigid or semi-rigid PTFE. In various embodiments, upper segment 910 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, upper segment 910 comprises a non-polymeric material, such as a silicon-based compound or a metallic material. For example, at elevated temperatures (such as, for example, above 260° C.) a silicon-based compound or metallic material may have a higher CTE, which may improve performance of upper segment 910 (as compared to the performance of a polymeric material at the same elevated temperature).

Upper retaining ring 912 is surrounds a portion of the OD of seat liner assembly 906. Upper retaining ring 912 is disposed coaxial or substantially coaxial with respect to seat liner assembly 906. In various embodiments, upper retaining ring 912 has an inner diameter less than upper segment 910 such that upper retaining ring 912 contacts the OD of seat liner housing 904. In various embodiments, upper retaining ring 912 has an outer diameter greater than upper segment 910 such that upper retaining ring 912 contacts the OD of seat liner housing 904. Upper retaining ring 912 may comprise one or more metals, such as, for example, various steel alloys, stainless steel, titanium, titanium alloys, and nickel chromium alloys, such as an austenitic nickel-chromium alloy such as the austenitic nickel-chromium alloy sold under the trademark INCONEL.

Seat liner assembly 906 is circumferentially at least partially surrounded by lower segment 916. Lower segment 916 interfaces with and/or contacts the OD surface of seat liner assembly 906. Lower segment 916 comprises a compliant material. In various embodiments, lower segment 916 may comprise one or more of thermoplastics and/or thermosets and/or polymeric materials. Compliant material include, for example, rubber, silicone, synthetic rubbers, polytetrafluoroethylene (PTFE), glass filled PTFE, expanded PTFE, and other similar materials. For example, lower segment 916 can comprise rigid or semi-rigid PTFE. In various embodiments, lower segment 916 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, lower segment 916 comprises a non-polymeric material, such as a silicon-based compound or a metallic material. For example, at elevated temperatures (such as, for example, above 260° C.) a silicon-based compound or metallic material may have a higher CTE, which may improve performance of lower segment 916 (as compared to the performance of a polymeric material at the same elevated temperature).

With momentary reference to FIGS. 10A and 10B, lower segment 916 comprises radial cut out 1002. Radial cut out 1002 comprises an area of reduced radius that aligns or substantially axially aligns with radial inset 1002 of seat liner housing 904, which together form circumferential channel 1012. Radial inset 1002 of seat liner housing 904 comprises an area of reduced radial thickness of seat liner housing 904. In that regard, upper retaining ring 912 is disposed distal to upper segment 910 and end ring 918 is disposed distal to upper retaining ring 912.

Lock ring 914 comprises lock ring portion 914a and lock ring portion 914b. Lock ring portion 914a and lock ring portion 914b circumferentially surround the OD of seat liner housing 904 and is configured to be disposed in circumferential channel 1012. In response to exposure to operating temperatures above room temperature, lower segment 916 radially expands, exerting a radial compressive force on seat liner housing 904.

End ring 918 is configured to be disposed at least partially circumferentially around lower segment 916. End ring 918 comprises a compliant material. In various embodiments, end ring 918 may comprise one or more of thermoplastics and/or thermosets and/or polymeric materials. Compliant material include, for example, rubber, silicone, synthetic rubbers, polytetrafluoroethylene (PTFE), glass filled PTFE, expanded PTFE, and other similar materials. For example, end ring 918 can comprise rigid or semi-rigid PTFE. In various embodiments, end ring 918 comprises carbon filled PTFE. Carbon filled PTFE may comprise a mixture of PTFE and a carbon form, for example, carbon powder. Carbon filled PTFE may comprise from 0.2% carbon powder to 40% carbon powder by weight, with the balance of the weight being PTFE. Carbon filled PTFE may comprise PTFE and graphite. In various embodiments, lower segment 916 comprises a non-polymeric material, such as a silicon-based compound or a metallic material. For example, at elevated temperatures (such as, for example, above 260° C.) a silicon-based compound or metallic material may have a higher CTE, which may improve performance of end ring 918 (as compared to the performance of a polymeric material at the same elevated temperature).

In this manner, valve seat assembly 900 may be assembled without the use of bolts. Moreover, valve seat assembly may be assembled by stacking the components together, held together by the lock ring.

In various embodiments, a valve seat assembly comprising a seat liner assembly comprising a seat liner coaxially disposed within a seat liner housing; an upper retaining ring disposed distal to an upper segment; a lower segment disposed distal to the upper retaining ring, the lower segment comprising a radial cut out and the seat liner housing comprising a radial inset, the radial inset and the radial cut out forming a circumferential channel. In various embodiments, the valve seat assembly further comprising a lock ring disposed at least partially in the circumferential channel. In various embodiments, the valve seat assembly, wherein the upper retaining ring, the upper segment, and the lower segment, are coaxial. In various embodiments, the valve seat assembly, further comprising an end collar, the end collar disposed circumferentially about the seat liner assembly. In various embodiments, the valve seat assembly wherein the end collar comprises a radial extension and the seat liner housing comprises a radial step. In various embodiments, the valve seat assembly, wherein the radial extension comprises a portion of the end collar with a reduced diameter relative to a proximal portion of the end collar and wherein the radial extension comprises a portion of the seat liner housing has a larger outer diameter relative to a distal portion of the seat liner housing. In various embodiments, the valve seat assembly, wherein the end collar and the upper retaining ring comprise a metal. In various embodiments, the valve seat assembly, wherein the lower segment and the upper segment comprise a compliant material. In various embodiments, the valve seat assembly of, wherein the seat liner comprises a ceramic material. In various embodiments, the valve seat assembly, wherein the end collar and the proximal terminus of the seat housing assembly are coplanar. In various embodiments, the valve seat assembly, wherein the lock ring comprises a first lock ring portion and a second lock ring portion, the first lock ring portion being separate from the second lock ring portion and spanning 180 degrees about the seat liner housing.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A valve seat assembly comprising:
a ceramic seat liner coaxially disposed with a ceramic seat end liner;
an upper segment surrounding a first outer diameter surface portion of the ceramic seat liner, the upper segment disposed with the ceramic seat liner; and
a lower segment surrounding a second outer diameter surface portion of the ceramic seat liner, the first outer diameter surface portion being proximal to the second outer diameter surface portion;
an upper retaining ring surrounding the first outer diameter surface portion of the upper segment, wherein the upper retaining ring is disposed radially outward of the ceramic seat liner and the upper segment;
wherein the upper segment comprises at least one of PTFE and carbon-filled PTFE;
wherein the ceramic seat liner comprises at least one of silicon carbide (SiC), boron carbide ($B_4C$), tungsten carbide (WC), and zirconia ($ZrO_2$);
wherein a lower retaining ring surrounds and contacts an outer diameter of the ceramic seat end liner;
wherein an inner diameter of the ceramic seat end liner increases in a distal direction; and
a bolt disposed in an axial direction with respect to the ceramic seat liner, the bolt passing through the upper segment and the lower segment, wherein the bolt is coupled to the upper retaining ring.

2. The valve seat assembly of claim 1, wherein the upper retaining ring comprises titanium.

3. The valve seat assembly of claim 1, further comprising a bolt retaining ring disposed distal to the upper retaining ring, the bolt passing through the bolt retaining ring.

4. The valve seat assembly of claim 3, further comprising a lid disposed distal to the upper retaining ring.

5. The valve seat assembly of claim 4, further comprising a lower seat flange disposed distal to the upper retaining ring and proximal to the lower retaining ring.

6. The valve seat assembly of claim 5, further comprising a blast tube liner.

7. The valve seat assembly of claim 6, wherein the blast tube liner is disposed distal to the ceramic seat end liner, wherein the blast tube liner has a proximal radial diameter greater than a distal-most diameter of the ceramic seat end liner.

8. The valve seat assembly of claim 7, wherein a blast tube at least partially surrounds an outer diameter surface of the blast tube liner.

9. The valve seat assembly of claim 1, further comprising a blast tube liner wherein the blast tube liner is disposed distal to the ceramic seat end liner, wherein the blast tube liner has a proximal radial diameter equal to a distal-most diameter of the ceramic seat end liner.

10. A method of manufacturing a valve seat assembly comprising:
disposing a ceramic seat liner to be coaxial with a ceramic seat end liner;
coupling an upper segment surrounding a first outer diameter surface portion of the ceramic seat liner, the upper segment disposed with the ceramic seat liner;
coupling a lower segment surrounding a second outer diameter surface portion of the ceramic seat liner, the first outer diameter surface portion being proximal to the second outer diameter surface portion;
disposing an upper retaining ring around the first outer diameter surface portion of the upper segment, wherein the upper retaining ring is disposed radially outward of the ceramic seat liner and the upper segment; and
disposing a bolt in an axial direction with respect to the ceramic seat liner, the bolt passing through the upper segment and the lower segment.

11. The method of manufacturing of claim 10, further comprising coupling the bolt to the upper retaining ring.

12. The method of manufacturing of claim 10, further comprising coupling a blast tube liner distal to the ceramic seat end liner.

13. A valve seat assembly comprising:
a ceramic seat liner coaxially disposed with a ceramic seat end liner;
an upper segment surrounding a first outer diameter surface portion of the ceramic seat liner, the upper segment disposed with the ceramic seat liner;

a lower segment surrounding a second outer diameter surface portion of the ceramic seat liner, the first outer diameter surface portion being proximal to the second outer diameter surface portion;

an upper retaining ring surrounding the first outer diameter surface portion of the upper segment, wherein the upper retaining ring is disposed radially outward of the ceramic seat liner and the upper segment;

wherein the upper segment comprises at least one of PTFE and carbon-filled PTFE;

wherein the ceramic seat liner comprises at least one of silicon carbide (SiC), boron carbide ($B_4C$), tungsten carbide (WC), and zirconia ($ZrO_2$);

wherein a lower retaining ring surrounds and contacts an outer diameter of the ceramic seat end liner;

wherein an inner diameter of the ceramic seat end liner increases in a distal direction; and a blast tube liner wherein the blast tube liner is disposed distal to the ceramic seat end liner, wherein the blast tube liner has a proximal radial diameter equal to a distal-most diameter of the ceramic seat end liner.

14. The valve seat assembly of claim 13, wherein the upper retaining ring comprises titanium.

\* \* \* \* \*